United States Patent
Morimoto et al.

(10) Patent No.: US 8,142,320 B2
(45) Date of Patent: Mar. 27, 2012

(54) SHIFT CONTROL APPARATUS FOR AUTOMATIC TRANSMISSION

(75) Inventors: Takahiro Morimoto, Bruxelles (JP); Haruki Sato, Anjo (JP); Masatake Ichikawa, Kariya (JP); Hiroshi Tsutsui, Nishio (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 407 days.

(21) Appl. No.: 12/254,481

(22) Filed: Oct. 20, 2008

(65) Prior Publication Data

US 2009/0170650 A1 Jul. 2, 2009

(30) Foreign Application Priority Data

Dec. 28, 2007 (JP) ................................. 2007-339366

(51) Int. Cl.
*F16H 31/00* (2006.01)
(52) U.S. Cl. ........................................................ 475/125
(58) Field of Classification Search .................. 475/125, 475/254, 256, 269, 284, 285, 330; 477/70, 477/80

See application file for complete search history.

(56) References Cited

U.S. PATENT DOCUMENTS

| | | | |
|---|---|---|---|
| 5,957,809 A | 9/1999 | Jang | |
| 6,139,463 A * | 10/2000 | Kasuya et al. | 475/275 |
| 6,176,802 B1 * | 1/2001 | Kasuya et al. | 475/269 |
| 6,712,735 B2 | 3/2004 | Hayabuchi et al. | |
| 7,628,729 B2 * | 12/2009 | Sato et al. | 477/127 |
| 2002/0086761 A1 | 7/2002 | Hayabuchi et al. | |
| 2002/0147071 A1 | 10/2002 | Hayabuchi et al. | |

FOREIGN PATENT DOCUMENTS

| | | |
|---|---|---|
| DE | 19735751 A1 | 5/1998 |
| DE | 60205522 T2 | 3/2006 |
| JP | 2002-195401 A | 7/2002 |
| JP | 2003-106440 A | 4/2003 |
| JP | 2006-275075 A | 10/2006 |

OTHER PUBLICATIONS

German Office Action dated Sep. 24, 2010.

* cited by examiner

*Primary Examiner* — David D Le
*Assistant Examiner* — David J Hlavka
(74) *Attorney, Agent, or Firm* — Sughrue Mion, PLLC

(57) ABSTRACT

A shift control apparatus that disconnects and connects respective pairs of friction engagement elements during downshift to a speed spaced apart by two or more steps through an intermediate shift speed. A shift controller controls a hydraulic pressure of a second shift release element by feedback control, and in accordance with the increase in the torque capacity of the second shift release element, also controls the torque capacity of a first shift engagement element so as to be sufficiently higher than the amount of change in the torque capacity of the second shift release element. The occurrence of adverse consequences in which a shift shock is generated is effectively suppressed because a sufficient reaction force cannot be ensured during engagement switching due to insufficient torque capacity of the first shift engagement element, and since the second shift release element cannot be appropriately feedback-controlled, difficulty in control of rotation change results.

1 Claim, 15 Drawing Sheets

FIG. 3

|   | C-1 | C-2 | C-3 | B-1 | B-2 | F-1 |
|---|-----|-----|-----|-----|-----|-----|
| P |     |     |     |     |     |     |
| REV |   |     | O   |     | O   |     |
| N |     |     |     |     |     |     |
| 1ST | O |     |     |     | (O) | O   |
| 2ND | O |     |     | O   |     |     |
| 3RD | O |     | O   |     |     |     |
| 4TH | O | O   |     |     |     |     |
| 5TH |   | O   | O   |     |     |     |
| 6TH |   | O   |     | O   |     |     |

\* THE MARK (O) INDICATES ENGAGEMENT DURING ENGINE BRAKE

F I G . 4
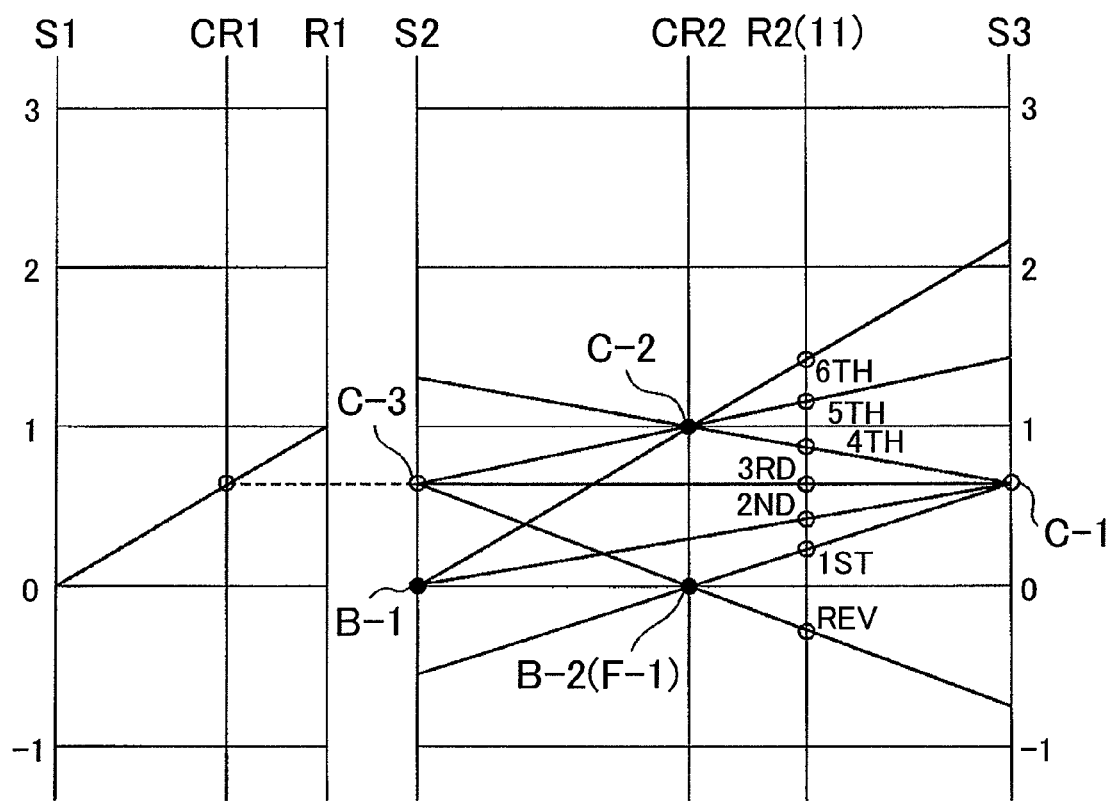

F I G . 12
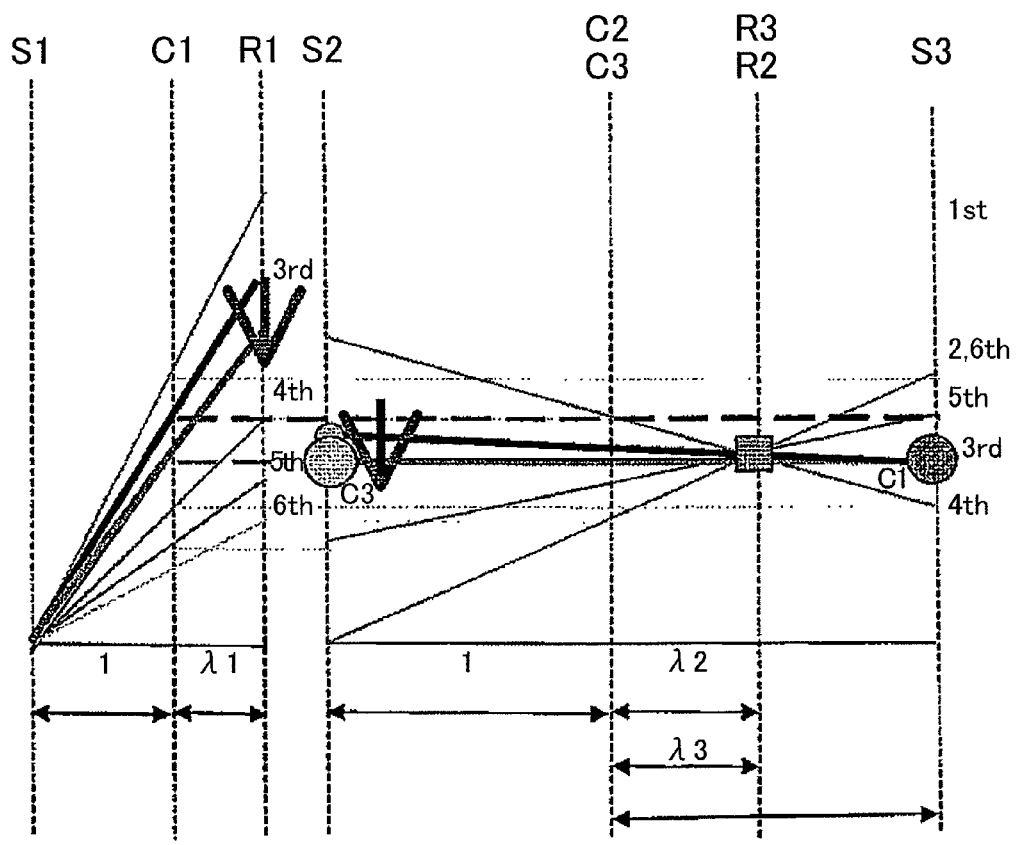

SHIFT CONTROL APPARATUS FOR AUTOMATIC TRANSMISSION

INCORPORATION BY REFERENCE

The disclosure of Japanese Patent Application No. 2007-339366 filed on Dec. 28, 2007 including the specification, drawings and abstract is incorporated herein by reference in its entirety.

BACKGROUND OF THE INVENTION

1. Field of the Invention

The present invention relates to a shift control apparatus for an automatic transmission mounted on a vehicle such as an automobile, and more in detail, to a shift control apparatus for an automatic transmission that is capable of providing improvement in a shift shock during a jumping shift by so-called clutch-to-clutch operation (engagement switching).

2. Description of the Related Art

Conventionally, for example, a stepped automatic transmission mounted on a vehicle is capable of shifting speeds by controlling the engagement state of a plurality of friction engagement elements (clutches and brakes) using a hydraulic control device, and thus forming a power transmission path in a speed change gear mechanism at each shift speed. Furthermore, in recent years, multi-speed automatic transmissions have been required to attempt an improvement in vehicle fuel consumption, and in order to select optimal shift speeds corresponding to the driver's requirement (that is, accelerator pedal stroke, and so on). In such automatic transmissions, it has become common to use jumping shifts, that is, speed shifting to a speed spaced apart by two or more steps (for example, 4th-to-2nd, 5th-to-2nd, 2nd-to-4th, and 2nd-to-5th shifts) at a single shifting operation.

Since the range of selection of a shift speed suitable for the driving condition of a vehicle becomes larger in the multiple speed gear train described above, the switching operation between friction engagement elements is not limited to a simple engagement switching using two elements but is required to be a complex switching operation using, for example, four elements. For example, in an engagement switching operation of four elements (so-called dual changeover) in which two friction engagement elements are released and two friction engagement elements are engaged, if, for example, a 6th-to-3rd shift employs a 6th-4th-3rd shift operation using the fourth forward speed as an intermediate shift speed, the torque distribution ratio to a high clutch (C-2) at the intermediate shift speed is smaller than the torque distribution ratio to the high clutch at the sixth forward speed. As a result, the high clutch does not automatically slip during the 4th-to-3rd shift, resulting in a poor controllability of the high clutch. In addition, because the gear ratio changes quickly during the 6th-to-4th shift and the change in gear ratio is suppressed in the narrow range of the 4th-to-3rd shift, the engine is may race due to difficulty in control. Moreover, the clutch distribution ratios of the high clutch on the release side and a 3-5 reverse clutch (C-3) on the engagement side are small during the 6th-to-4th shift which has a large effect on shock, thus causing a variation of hydraulic pressure.

Therefore, in order to address the problems as described above, shift control apparatuses for automatic transmissions have been developed such as described below (refer, for example, to Japanese Patent Application Publication No. JP-A-2003-106440). When the shift control apparatus described in the patent document performs a dual changeover shift in which two friction engagement elements to be engaged and two friction engagement elements to be released are changed over at the same time, shift control is made easy by reducing the time for shifting. Also, hydraulic control during a second changeover shift, which has a large effect on shock, is made easy, thus enabling suppression of shift shocks.

A certain shift control apparatus such as described in the above-mentioned patent document performs feedback control (hereinafter called also FB control) to calculate and output a second shift release pressure required for producing an appropriate rotation change during shifting by engagement switching of pairs of friction engagement elements (engagement switching of four elements). In that case, if the torque capacity of a first shift engagement element to serve as a reaction force element is insufficient, no sufficient effect of the feedback control is obtained, and therefore the control of the rotation change is made difficult, causing a possibility of shift shock generation.

SUMMARY OF THE INVENTION

The present invention provides a shift control apparatus for an automatic transmission that is structured so as to ensure the FB control using a second shift release element by ensuring that the first shift engagement element has a sufficient reaction force. This is provided through monitoring of the torque capacity of the second shift release element in calculating the required torque capacity of the first shift engagement element, during downshift to a speed spaced apart by two or more steps through an intermediate shift speed by disconnecting and connecting the respective pairs of the friction engagement elements. Thus, shift shocks can be effectively suppressed.

A first aspect of the present invention is a shift control apparatus for a stepped automatic transmission which has a plurality of friction engagement elements whose engagement states achieve a plurality of corresponding power transmission paths in a speed change gear mechanism. The shift control apparatus shifts speeds by switching engagement among those friction engagement elements. The shift control apparatus includes a controller capable of controlling a downshift to a speed spaced apart by two or more steps through an intermediate shift speed by disconnecting and connecting respective pairs of the plurality of friction engagement elements at a single switching of the engagement. The pairs of the friction engagement elements are: a pair of a first shift release element that is in the engaged state at a high shift speed on the higher speed side of the intermediate shift speed and released during shifting from the high shift speed to the intermediate shift speed, and a second shift release element that is in the engaged state at the high shift speed, maintaining the engagement during shifting from the high shift speed to the intermediate shift speed and released during shifting from the intermediate shift speed to a low shift speed on the lower speed side of the intermediate shift speed. A pair of a first shift engagement element that is in the released state at the high shift speed and engaged at the intermediate shift speed, maintains the engagement until reaching the low shift speed, and a second shift engagement element that is in the released state at both the high and intermediate shift speeds, is engaged at the low shift speed. The controller controls, during the downshift, a hydraulic pressure of the second shift release element by feedback control. In accordance with an increase in the torque capacity of the second shift release element, the controller also controls the torque capacity of the first shift engagement element so as to be sufficiently higher than the amount of change in the torque capacity of the second shift release element.

In this case, during the downshift to the speed spaced apart by two or more steps through the intermediate shift speed by disconnecting and connecting the respective pairs of the friction engagement elements, the controller controls the hydraulic pressure of the second shift release element by feedback control. In accordance with the increase in the torque capacity of the second shift release element, the controller also controls the torque capacity of the first shift engagement element so as to be sufficiently higher than the amount of change in the torque capacity of the second shift release element. Therefore, this appropriate downshifting can effectively suppress the occurrence of adverse consequences in which a shift shock is generated because a sufficient reaction force cannot be ensured during engagement switching due to insufficient torque capacity of the first shift engagement element, and therefore because the second shift release element cannot be appropriately feedback-controlled, resulting in difficulty in control of rotation change.

A second aspect of the present invention is that, during the downshift, the controller, after sequentially reducing each of the torque capacities of the first shift release element and the second shift release element, increases and again reduces the torque capacity of the second shift release element by feedback control, and also controls the torque capacity of the first shift engagement element which forms a reaction force during the feedback control, so as to be sufficiently higher than the amount of change in the torque capacity of the second shift release element, while monitoring the torque capacity of the second shift release element controlled by the feedback control.

In this case, during the downshift, the controller, after sequentially reducing each of the torque capacities of the first shift release element and the second shift release element, increases and again reduces the torque capacity of the second shift release element by feedback control, and also controls the torque capacity of the first shift engagement element, which forms a reaction force during the feedback control, so as to be sufficiently higher than the amount of change in the torque capacity of the second shift release element, while monitoring the torque capacity of the second shift release element controlled by the feedback control. Therefore, the feedback control of the second shift release element is ensured by ensuring the sufficient reaction force of the first shift engagement element, enabling effective generation of a suppressive force against engine racing.

A third aspect of the present invention is that the first shift release element and the second shift engagement element are the same friction engagement element.

In this case, because the first shift release element can be engaged as a second shift engagement element directly after being released, the control system can be simplified compared with the case in which two different friction engagement elements are controlled separately as a first shift release element and a second shift engagement element.

BRIEF DESCRIPTION OF THE DRAWINGS

The invention will now be described in greater detail with reference to FIG. 1 to 15, in which:

FIG. 3 is an engagement table for the automatic speed change mechanism;

FIG. 4 is a velocity diagram for the automatic speed change mechanism;

FIG. 12 is a velocity diagram in which the relation of input and output is reversed from that of FIG. 4;

DETAILED DESCRIPTION OF EXEMPLARY EMBODIMENTS OF THE INVENTION

Figure 1:
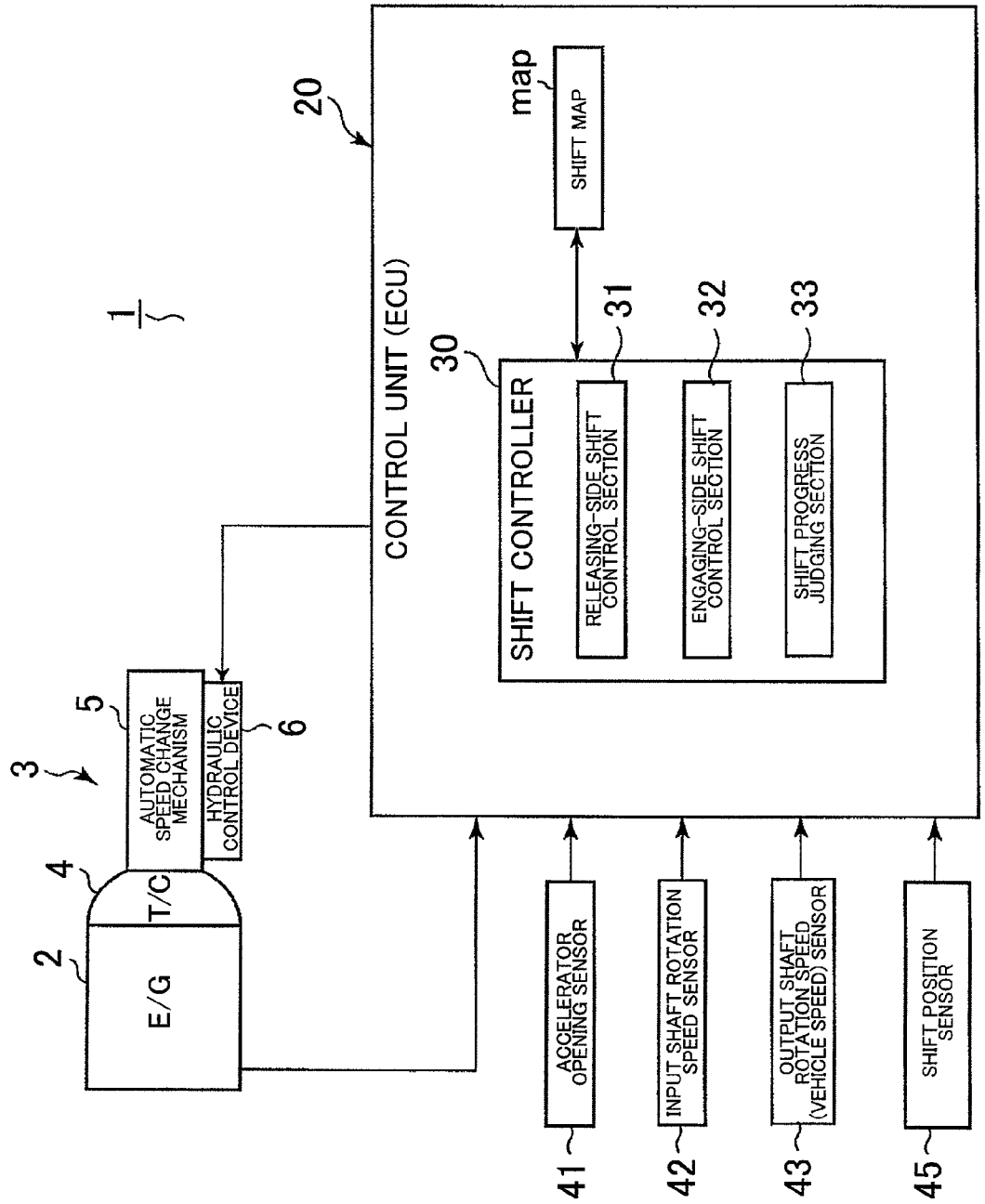
FIG. 1 is a block diagram showing an electrical control system, etc. for a shift control apparatus for an automatic transmission according to a non-limiting embodiment of the present invention.

A non-limiting embodiment according to the present invention will be described below with reference to FIGS. 1 to 15.

First, the outline structure of an automatic transmission 3 to which the present invention can be applied will be described with reference to FIG. 2. As shown in FIG. 2, the automatic transmission 3, which is suitable for use in, for example, an FF (front engine, front drive) type vehicle, has an input shaft 8 of the automatic transmission 3 connectable to an engine 2 (refer to FIG. 1), and is provided with a torque converter 4 and an automatic speed change mechanism 5 with their centers on the axis of the input shaft 8. Note that a reference numeral 9 shows a transmission case for housing the automatic speed change mechanism 5.

The automatic transmission 3 is a stepped automatic transmission, which has clutches C-1, C-2, and C-3, and brakes B-1 and B-2 serving as friction engagement elements whose engagement states achieve a plurality of corresponding power transmission paths in the automatic speed change mechanism (speed change gear mechanism), and which shifts speeds by switching engagement among those friction engagement elements. A shift controller 30 (refer to FIG. 1) described later controls a downshift to a speed spaced apart by two or more steps through an intermediate shift speed by disconnecting and connecting the respective pairs of the plurality of friction engagement elements at a single switching of the engagement.

The above-mentioned torque converter 4 has a pump impeller 4a connected to the input shaft 8 of the automatic transmission 3. A turbine runner 4b to which the rotation of the pump impeller 4a is transmitted through hydraulic fluid. The turbine runner 4b is connected to an input shaft 10 of the above-mentioned automatic speed change mechanism 5 arranged coaxially with the input shaft 8. In addition, the torque converter 4 is provided with a lockup clutch 7, and when the lockup clutch 7 is engaged by hydraulic control of a hydraulic control device 6 (refer to FIG. 1), the rotation of the input shaft 8 of the automatic transmission 3 is directly transmitted to the input shaft 10 of the automatic speed change mechanism 5.

The automatic speed change mechanism 5 is provided with a planetary gear SP and a planetary gear unit PU on the input shaft 10. The planetary gear SP is a so-called single pinion planetary gear, which is provided with a sun gear S1, a carrier CR1, and a ring gear R1. The carrier CR1 has a pinion P1 that meshes with the sun gear S1 and the ring gear R1.

In addition, the planetary gear unit PU is a so-called Ravigneaux type planetary gear, which has a sun gear S2, a sun gear S3, a carrier CR2, and a ring gear R2 as four rotating elements. The carrier CR2 has a long pinion PL that meshes with the sun gear S2 and the ring gear R2, and a short pinion PS that meshes with the sun gear S3, in an intermeshing manner.

The sun gear S1 of the planetary gear SP is connected to an unshown boss that is fixed as a unit to the transmission case 9, to be rotationally fixed. In addition, the ring gear R1 makes the same rotation as the rotation of the input shaft 10 (hereinafter called "input rotation"). Moreover, the carrier CR1 makes a decelerated rotation, which is decelerated from the input rotation by the fixed sun gear S1 and the ring gear R1 making the input rotation, and is also connected to the clutch C-1 and the clutch C-3.

The sun gear S2 of the planetary gear unit PU can be fixed to the transmission case 9 by being connected to the brake B-1 composed of a band brake, and is also connected to the clutch C-3 to be able to receive the decelerated rotation input from the carrier CR1 through the clutch C-3. In addition, the sun gear S3 is connected to the clutch C-1 to be able to receive the decelerated rotation input from the carrier CR1.

Moreover, the carrier CR2 is connected to the clutch C-2 receiving the rotation input from the input shaft 10 to be able to receive the input rotation through the clutch C-2, and also connected to a one-way clutch F-1 and the brake B-2, to be restricted in rotation in one direction relative to the transmission case 9 through the one-way clutch F-1 and to be able to be fixed in rotation through the brake B-2. Furthermore, the ring gear R2 is connected to a counter gear 11, and the counter gear 11 is connected to driving wheels through an unshown counter shaft and an unshown differential device.

Next, based on the above-described structure, the operation of the automatic speed change mechanism 5 will be described with reference to FIGS. 2, 3, and 4. Note that in the velocity diagram shown in FIG. 4, the direction of each vertical axis represents the rotation speed of a corresponding rotating element (gear), and the direction of the horizontal axis corresponds to the gear ratios of those rotating elements. In addition, in the area of the planetary gear SP of the velocity diagram, the vertical axes correspond to the sun gear S1, the carrier CR1, and the ring gear R1, in the order from the left in FIG. 4. Moreover, in the area of the planetary gear unit PU of the velocity diagram, the vertical axes correspond to the sun gear S3, the ring gear R2, the carrier CR2, and the sun gear S2, in the order from the right in FIG. 4.

For example, at the first forward speed (1ST) in the D (drive) range, the clutch C-1 and the one-way clutch F-1 are engaged, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S3 through the clutch C-1. In addition, the rotation of the carrier CR2 is restricted to one direction (forward rotating direction); that is, the carrier CR2 is prevented from rotating in the reverse direction to be fixed. Then, the decelerated rotation input to the sun gear S3 is output to the ring gear R2 through the fixed carrier CR2, and thus the forward rotation as the first forward speed is output from the counter gear 11.

In addition, during engine braking (coasting), the above-described state of the first forward speed is maintained in the manner in which the brake B-2 is locked to fix the carrier CR2 so that the carrier CR2 is prevented from rotating forward. Moreover, because the carrier CR2 is prevented from rotating in the reverse direction and allowed to rotate forward by the one-way clutch F-1 at the first forward speed, the first forward speed can be achieved more smoothly by automatic engagement of the one-way clutch F-1, in the case, for example, of a shift from a non-drive range to a drive range.

At the second forward speed (2ND), the clutch C-1 is engaged and the brake B-1 is locked, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S3 through the clutch C-1. In addition, the rotation of the sun gear S2 is fixed by the locking of the brake B-1. Then, the carrier CR2 makes a decelerated rotation slower than that of the sun gear S3, and the decelerated rotation input to the sun gear S3 is output to the ring gear R2 through the carrier CR2. Thus, the forward rotation, designated as the second forward speed, is output from the counter gear 11.

If the clutch C-1 is released from this state of the second forward speed (to a slipping state) by neutral control as describe later in detail, the ring gear R2 is allowed to rotate forward and prevented from rotating reversely by the one-way clutch F-1 for preventing the reverse rotation of the carrier CR2, and thus a state of so-called hill hold is achieved, in which the reverse motion of a vehicle (reverse rotation of driving wheels) is prevented.

At the third forward speed (3RD), the clutch C-1 and the clutch C-3 are engaged, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S3 through the clutch C-1. In addition, the decelerated rotation of the carrier CR1 is input to the sun gear S2 by the engagement of the clutch C-3. Because, in other words, the decelerated rotation of the carrier CR1 is input to the sun gear S2 and the sun gear S3, the planetary gear unit PU makes the decelerated rotation in a directly connected state, and the decelerated rotation is directly output to the ring gear R2. Thus, the forward rotation, designated as the third forward speed, is output from the counter gear 11.

At the fourth forward speed (4TH), the clutch C-1 and the clutch C-2 are engaged, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S3 through the clutch C-1. In addition, the input rotation is input to the carrier CR2 by the engagement of the clutch C-2. Then, a decelerated rotation faster than that of the above-described third forward speed is produced by the decelerated rotation input to the sun gear S3 and the input rotation input to the carrier CR2, and is output to the ring gear R2. Thus, the forward rotation, designated as the fourth forward speed is output from the counter gear 11.

At the fifth forward speed (5TH), the clutch C-2 and the clutch C-3 are engaged, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S2 through the clutch C-3. In addition, the input rotation is input to the carrier CR2 by the engagement of the clutch C-2. Then, an accelerated rotation slightly faster than that of the input rotation is produced by the decelerated rotation input to the sun gear S2 and the input rotation input to the carrier CR2, and is output to the ring gear R2. Thus, the forward rotation, designated as the fifth forward speed is output from the counter gear 11.

At the sixth forward speed (6TH), the clutch C-2 is engaged and the brake B-1 is locked, as shown in FIG. 3. Then, as shown in FIGS. 2 and 4, the input rotation is input to the carrier CR2 by the engagement of the clutch C-2. In addition, the rotation of the sun gear S2 is fixed by the locking of the brake B-1. Then, the input rotation of the carrier CR2 is made to be an accelerated rotation faster than that of the above-described fifth forward speed by the fixed sun gear S2, and is output to the ring gear R2. Thus, the forward rotation, designated as the sixth forward speed, is output from the counter gear 11.

At the first reverse speed (REV), the clutch C-3 is engaged and the brake B-2 is locked, as shown in FIG. 3. Then, as shown in FIGS. 2 and 4, the rotation of the carrier CR1, which makes the decelerated rotation provided by the fixed sun gear S1 and the ring gear R1 making the input rotation, is input to the sun gear S2 through the clutch C-3. In addition, the rotation of the carrier CR2 is fixed by the locking of the brake B-2. Then, the decelerated rotation input to the sun gear S2 is output to the ring gear R2 through the fixed carrier CR2, and thus the reverse rotation, designated as the first reverse speed, is output from the counter gear 11.

In addition, in the P (parking) range and in the N (neutral) range, the clutches C-1, C-2, and C-3 are released. Then, disconnection occurs between the carrier CR1 and the sun gears S2 and S3, that is, between the planetary gear SP and the planetary gear unit PU, and also the input shaft 10 and the carrier CR2 are disconnected. By this means, power transmission is disconnected between the input shaft 10 and the planetary gear unit PU, that is, between the input shaft 10 and the counter gear 11.

Next, a shift control apparatus 1 for the automatic transmission 3 according to the present embodiment of the present invention will be described with reference to FIGS. 1 and 5 to 14. Note that FIG. 1 is a block diagram showing an electrical control system, etc. for the shift control apparatus 1 for the automatic transmission 3 of the present embodiment.

Figure 2:
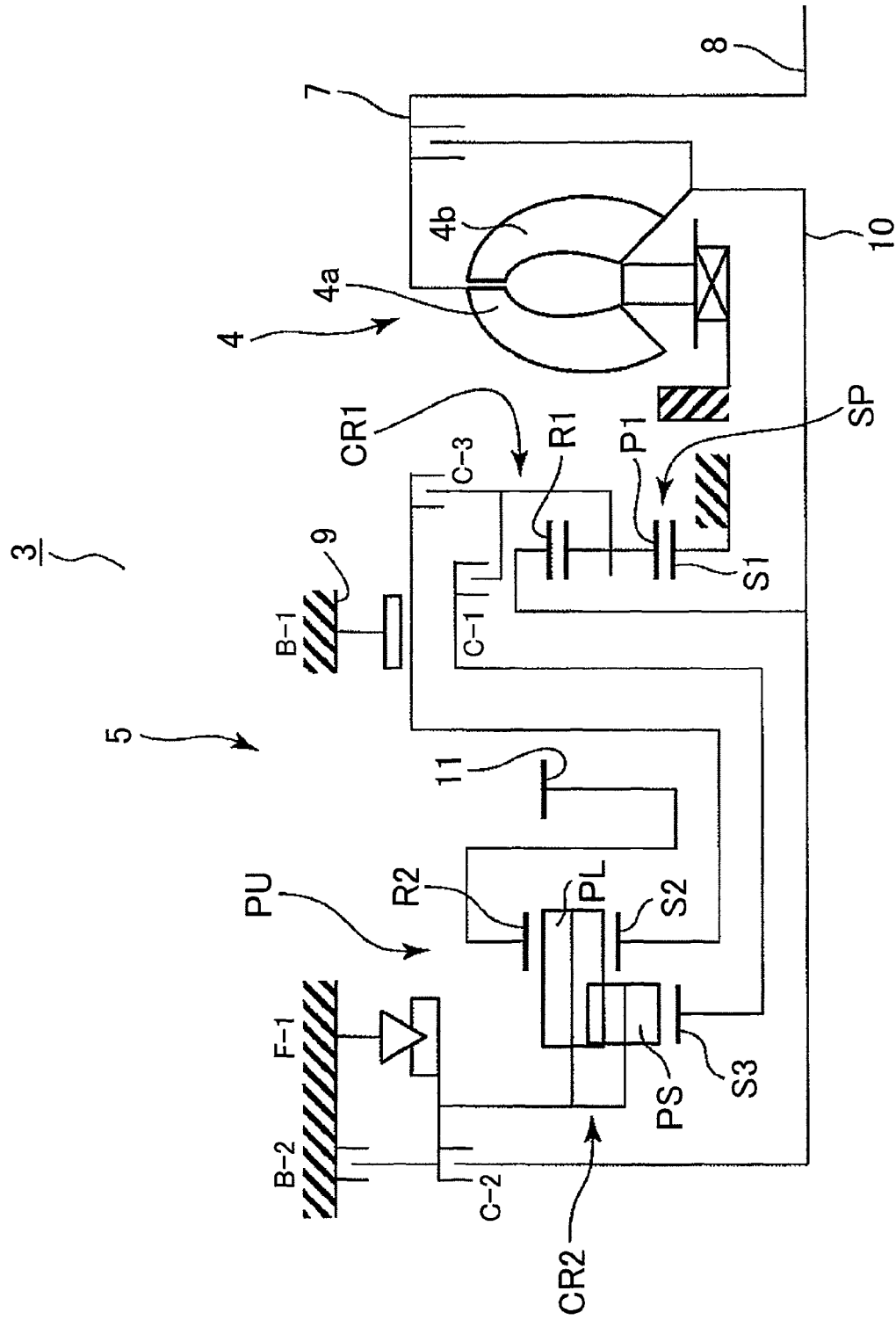
FIG. 2 is a skeleton diagram showing an automatic speed change mechanism to which the present invention can be applied.
Figure 9:
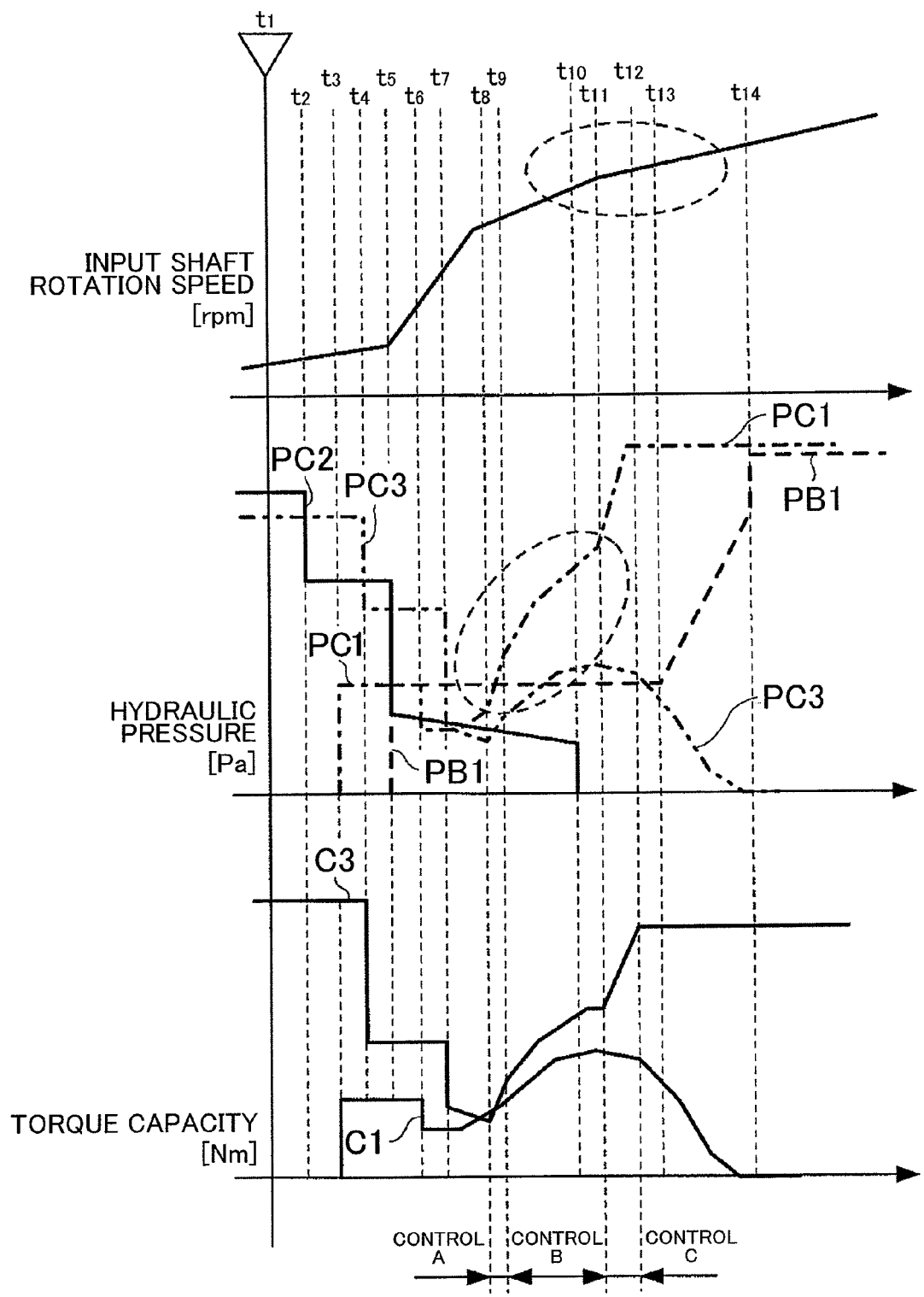
FIG. 9 is a time chart showing shift control according to an embodiment of the present invention.

Specifically, as shown in FIG. 1, the shift control apparatus 1 has a control unit (ECU) 20 composed of a microcomputer (MC), and the control unit 20 is provided with a shift controller 30 and a shift map (map). The graph shown in FIG. 9 is determined from the shift map (map), corresponding to the accelerator pedal stroke by a driver. Note that although the hydraulic pressure [Pa] shown in FIG. 9 actually indicates a hydraulic pressure command value, it will be used as a hydraulic pressure in the description below.

To the above-mentioned control unit 20, there are connected an accelerator opening sensor 41 for detecting the angle of an accelerator pedal (not shown) (that is, the driver's accelerator pedal stroke) of a vehicle on which the automatic transmission 3 and the shift control apparatus 1 are mounted, an input shaft rotation speed sensor 42 for detecting the rotation speed of the input shaft 10 of the automatic speed change mechanism 5 (=turbine speed), an output shaft rotation speed (vehicle speed) sensor 43 for detecting the speed of the vehicle by detecting the rotation speed of the counter gear 11 that is coupled with the unshown driving wheels, and a shift position sensor 45 for detecting the selected position of a shift lever (not shown); from these sensors, a variety of signals are sent to the control unit 20.

The above-mentioned shift controller 30 refers to the shift map (map) based on the accelerator opening detected by the accelerator opening sensor 41 and the vehicle speed detected by the output shaft rotation speed sensor 43, and then, making a judgment on the selection among the above-described first to sixth forward speeds, and electronically controlling shift valves (not shown), etc. in the hydraulic control device 6, controls the engagement and release states of the above-mentioned clutches and brakes C-1, C-2, C-3, B-1 and B-2 so that the selected shift speed is obtained. The hydraulic control device 6 is provided with many hydraulic servos (not shown) corresponding to the automatic speed change mechanism 5, as well as many shift valves for switching the hydraulic pressure to these hydraulic servos.

In addition, the shift controller 30 has releasing-side shift control section 31, engaging-side shift control section 32, and shift progress judging section 33.

The releasing-side shift control section 31 controls the releasing-side hydraulic pressure of the clutch C-2 serving as a first shift release element and of the clutch C-3 serving as a second shift release element. The engaging-side shift control section 32 controls the engaging-side hydraulic pressure of the clutch C-1 serving as a first shift engagement element and of the brake B-1 serving as a second shift engagement element. The shift progress judging section 33 detects the progress status of downshifting by detecting the rotation change based on the change in gear ratio during downshifting (power-on downshifting), and by comparing the detected value with a predetermined threshold value set in advance, judges the progress status of the shifting.

In other words, during downshifting, the shift controller (controller) 30 controls the hydraulic pressure of the clutch C-3 by feedback control, and in accordance with the increase in the torque capacity of the clutch C-3, also controls the torque capacity of the clutch C-1 so as to be sufficiently higher than the amount of change in the torque capacity of the clutch C-3. More specifically, during the downshift, the shift controller 30, after sequentially reducing each of the torque capacities of the clutch C-2 and the clutch C-3, increases and again reduces the torque capacity of the clutch C-3 by feedback control. The shift controller 30 also controls the torque capacity of the clutch C-1, which forms a reaction force during the feedback control, so as to be sufficiently higher than the amount of change in the torque capacity of the clutch C-3, while monitoring the torque capacity of the clutch C-3 controlled by the feedback control.

Note that when shifting is performed through shift speeds from the above-described first forward speed to sixth forward speed, the role of each linear solenoid valve (not shown) is switched depending on each shifting operation. In other words, one linear solenoid valve serves as a linear solenoid valve for regulating the pressure supplied to a hydraulic servo of a friction engagement element on the engaging side (engaging-side pressure control valve) in one shifting operation, and as a linear solenoid valve for regulating the pressure supplied to a hydraulic servo of a friction engagement element on the releasing side (releasing-side pressure control valve) in another shifting operation.

Figure 5:
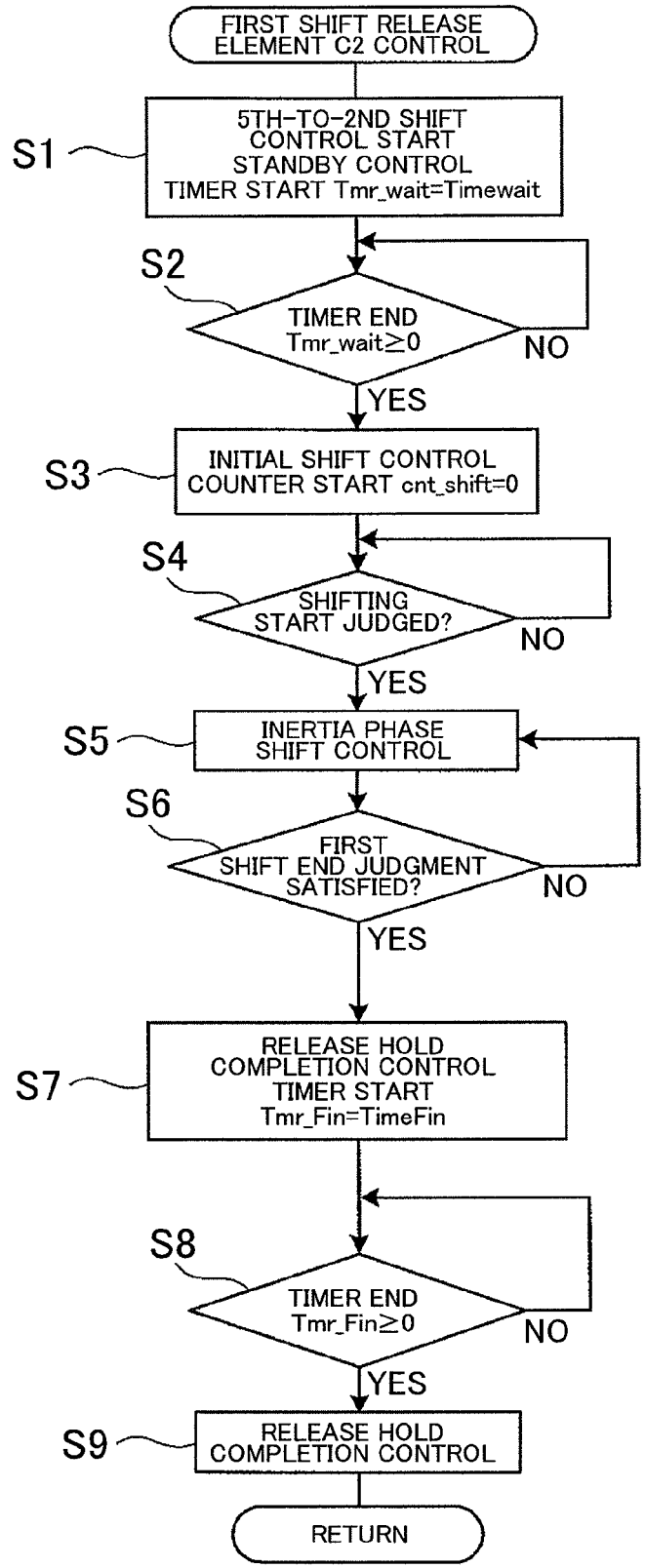
FIG. 5 is a flow chart for control of a clutch C-2 serving as a first shift release element.
Figure 6:
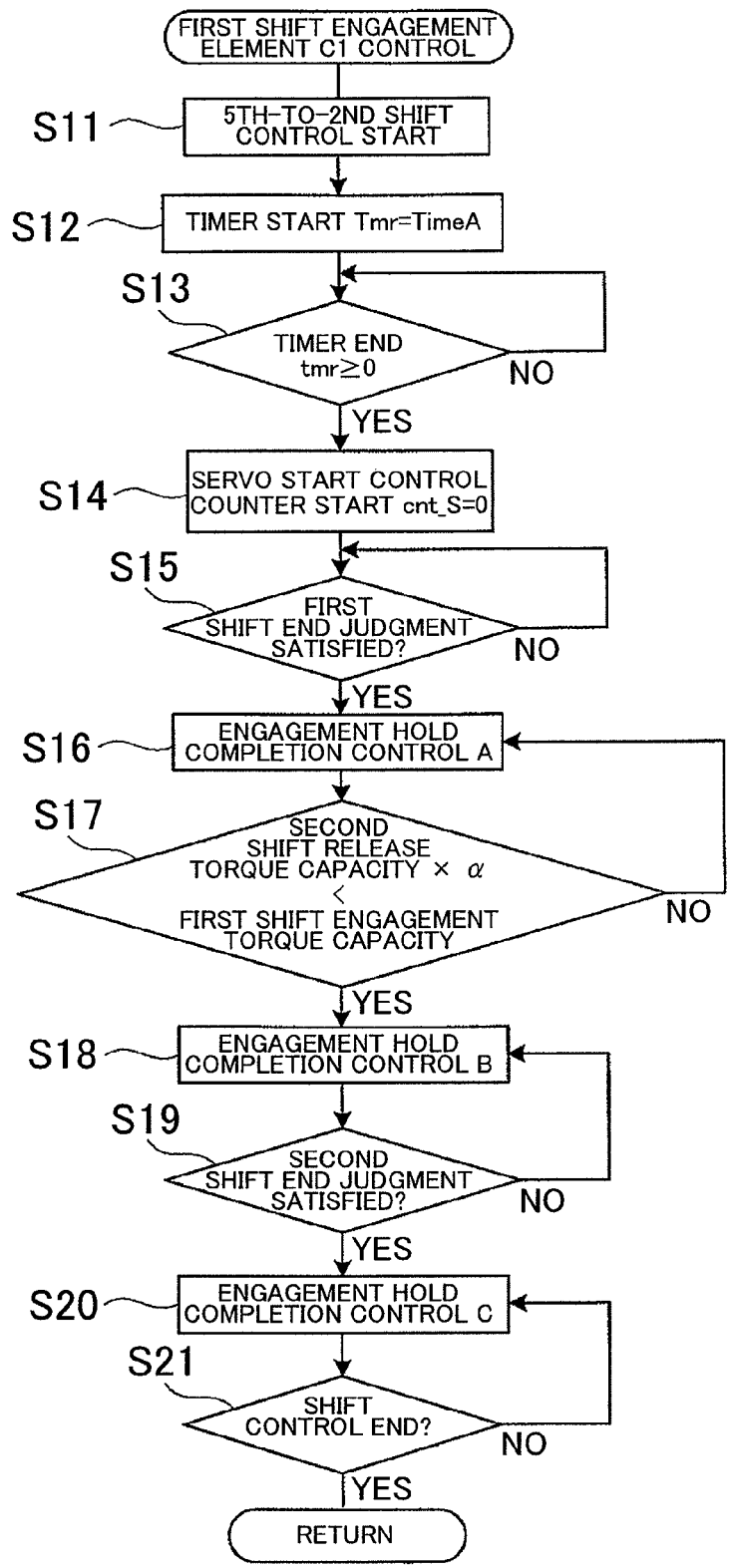
FIG. 6 is a flow chart for control of a clutch C-1 serving as a first shift engagement element.
Figure 7:
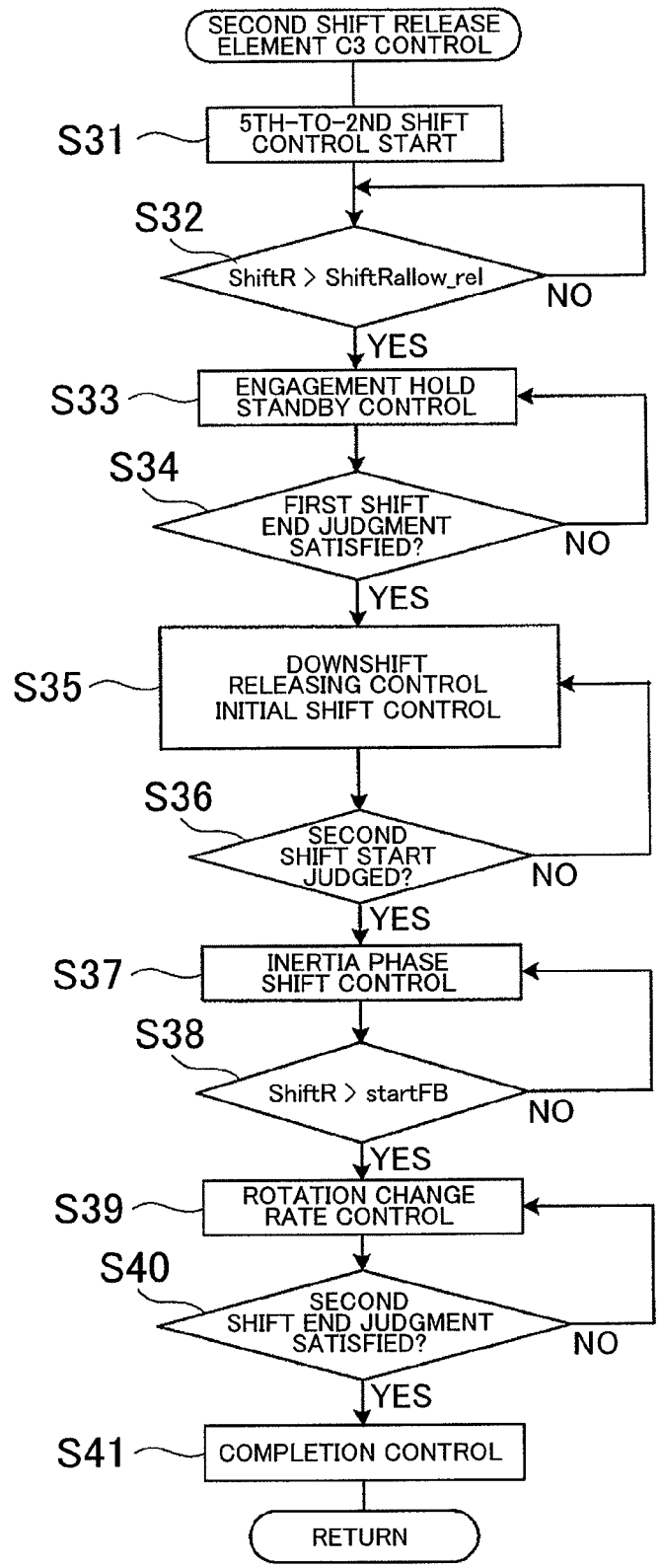
FIG. 7 is a flow chart for control of a clutch C-3 serving as a second shift release element.
Figure 8:
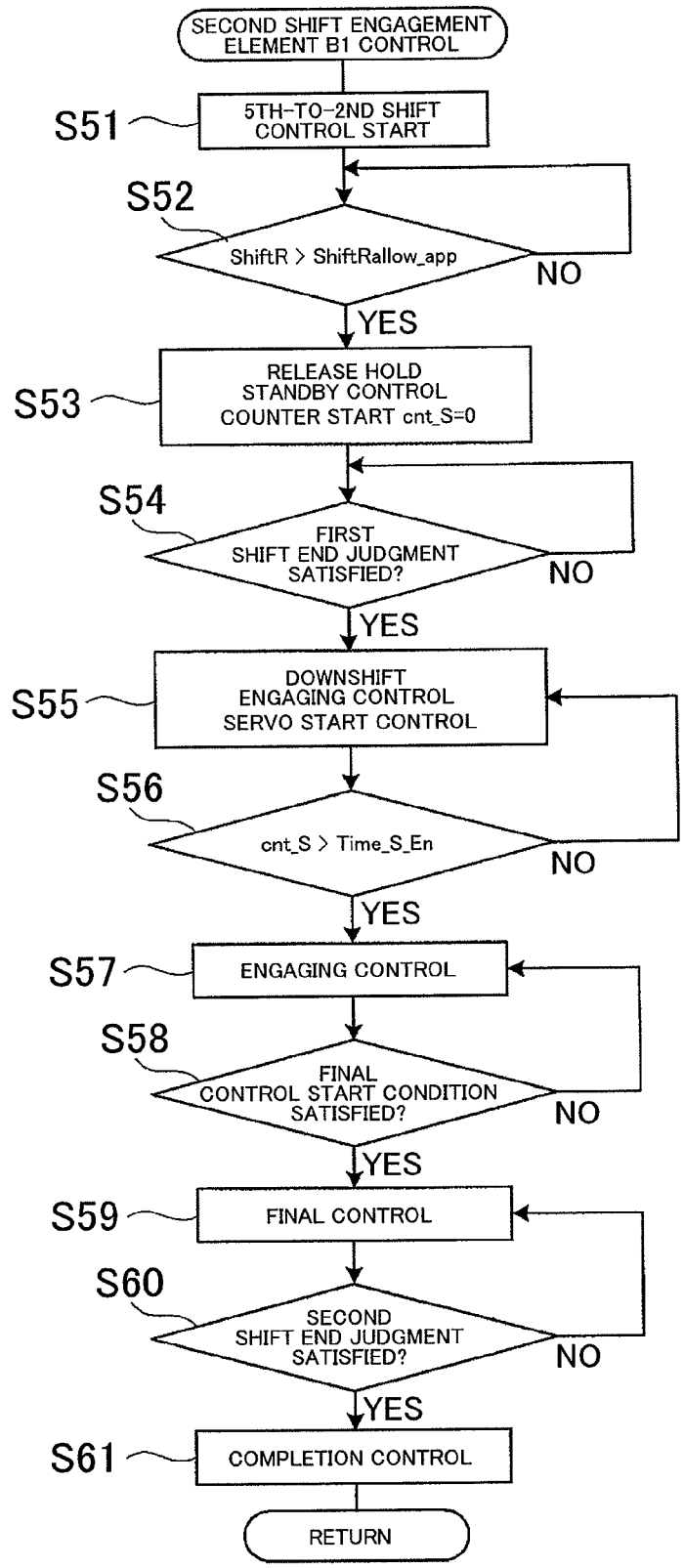
FIG. 8 is a flow chart for control of a brake B-1 serving as a second shift engagement element.

Next, shift control by the shift control apparatus 1 according to the present embodiment of the present invention will be described by way of an example in which the shift control is applied to a downshift, for example, to a 5th-to-2nd shift (5th-3rd-2nd shift) by engagement switching of four elements, and with reference to FIGS. 5 to 13. Note that FIG. 5 is a flow chart for control of the clutch C-2 serving as a first shift release element; FIG. 6 is a flow chart for control of the clutch C-1 serving as a first shift engagement element; FIG. 7 is a flow chart for control of the clutch C-3 serving as a second shift release element; and FIG. 8 is a flow chart for control of the brake B-1 serving as a second shift engagement element. In addition, FIG. 9 is a time chart showing shift control according to the present embodiment of the present invention, and shows from the top, the rotation speed of the input shaft 10 of the automatic speed change mechanism 5 (input shaft rotation speed), the respective hydraulic pressures (hydraulic pressure command values) of the clutches C-1, C-2, and C-3, and the brake B-1 serving as four elements of engagement switching, and the torque capacities of the clutches C-1 and C-3. FIGS. 10 to 13 are velocity diagrams in which the relation of input and output is reversed from that of FIG. 4.

In the present embodiment, the pairs of friction engagement elements used for downshift by engagement switching of the four elements are a pair of the clutch C-2 (first shift release element) that is in the engaged state at the fifth forward speed (high shift speed) on the higher speed side of the third forward speed (intermediate shift speed) and released during shifting from the fifth forward speed to the third forward speed, and the clutch C-3 (second shift release element) that is in the engaged state at the fifth forward speed, maintaining the engagement during shifting from the fifth forward speed to the third forward speed and released during shifting to the second forward speed on the lower speed side of the third forward speed; and a pair of the clutch C-1 (first shift engagement element) that is in the released state at the fifth forward speed and engaged at the third forward speed, maintaining the engagement until reaching the second forward speed, and the brake B-1 (second shift engagement element) that is in the released state at both the fifth and third forward speeds, and engaged at the second forward speed.

In other words, when downshifting (power downshifting) is performed during driving at the fifth forward speed, a shift command is issued from the shift controller 30, and then the releasing-side shift control section 31 starts controlling the clutch C-2. At this point of time, the clutch C-2 and the clutch C-3 are in the completely engaged state, establishing the fifth gear, as shown in FIG. 3.

First, at S1 (corresponding to time $t_2$ to $t_5$ in FIG. 9), the releasing-side shift control section 31 starts a standby control along with the start of a 5th-to-2nd shift control, and sets a timer (countdown timer) to a predetermined time Tmr_wait set in advance (Tmr_wait=Timewait). In the releasing control, the hydraulic pressure is controlled so as to be simply released without feedback control.

Subsequently, the releasing-side shift control section 31 continues to judge whether the predetermined time tmr_wait has passed or not (Tmr_wait≦0) (S2; NO), and when the predetermined time tmr_wait has passed and the timer has ended (S2; YES), proceeds to S3.

At S3 (corresponding to time $t_5$ to $t_6$ in FIG. 9), a counter is started (cnt_shift=0) along with the start of initial shift control, and then the procedure proceeds to S4. The above-mentioned initial shift control reduces the pressure of the hydraulic servo of the clutch C-2 by one step, and then gradually reduces the pressure until immediately before the clutch C-2 starts to slip. Then, the start of shifting is judged in S4, and if the shifting is judged to be started (S4; YES), the procedure proceeds to S5.

At S5 (corresponding to time $t_6$ to $t_8$ in FIG. 9), inertia phase shift control is executed, and then the procedure proceeds to S6. In the inertia phase shift control, the hydraulic pressure of the clutch C-2 is further reduced. By this means, the power transmission between the engine 2 and the driving wheels (counter gear 11) is gradually disconnected by the automatic speed change mechanism 5, and thus the rotation speed of the engine 2 with a reduced load starts to rise.

At S6, it is judged whether a first shift end judgment is satisfied. While the judgment is not satisfied, S5 is repeated, and when it is judged to be satisfied, the procedure proceeds to S7. At S7 (corresponding to time $t_9$ to $t_{10}$ in FIG. 9), along with the start of a release hold completion control, a timer (countdown timer) is set to a predetermined time Tmr_Fin set in advance (Tmr_Fin=TimeFin), and then the procedure proceeds to S8. At S8, it is judged whether the predetermined time Tmr_Fin has passed or not (Tmr_Fin≧0) (S8; NO), and when the timer has ended (S8; YES), the procedure proceeds to S9 to end the release hold completion control.

On the other hand, in the control of the clutch C-1 serving as a first shift engagement element shown in FIG. 6, the engaging-side shift control section 32 starts the 5th-to-2nd shift control based on the shift command at S11, then sets a timer TimeA to a predetermined time tmr set in advance (tmr=TimeA) at S12, and judges whether the predetermined time tmr has passed or not (tmr≧0) (S13; NO).

Then, when the timer has ended (S13; YES), the procedure proceeds to S14 (corresponding to time $t_3$ to $t_7$ in FIG. 9), in which servo start control is started and counting (timing) until a preset value cnt_S reaches 0 (cnt_S=0) is started, and then proceeds to S15. The above-mentioned servo start control increases the pressure of the hydraulic servo of the clutch C-1 serving as a first shift engagement element to close a backlash between a piston of the hydraulic servo and a friction plate of the clutch C-1 (corresponding to time $t_3$ to $t_7$ in FIG. 9).

At S15, the shift progress judging section 33 keeps monitoring the progress status of shifting to judge whether the first shift end judgment is satisfied or not. During this judgment, that is, during first shift rotation change (during 5th-to-3rd shift rev-up), in the velocity diagram (refer to FIG. 4), the release pressure of the first shift (hydraulic pressure of the clutch C-2) is reduced by a maximum extent, and also the once reduced hydraulic pressure of the clutch C-3 is increased. Subsequently, the release pressure of the second shift (hydraulic pressure of the clutch C-3) is reduced, and the rotation of the turbine runner 4b (hereinafter called turbine rotation) is further revved up.

Figure 10:
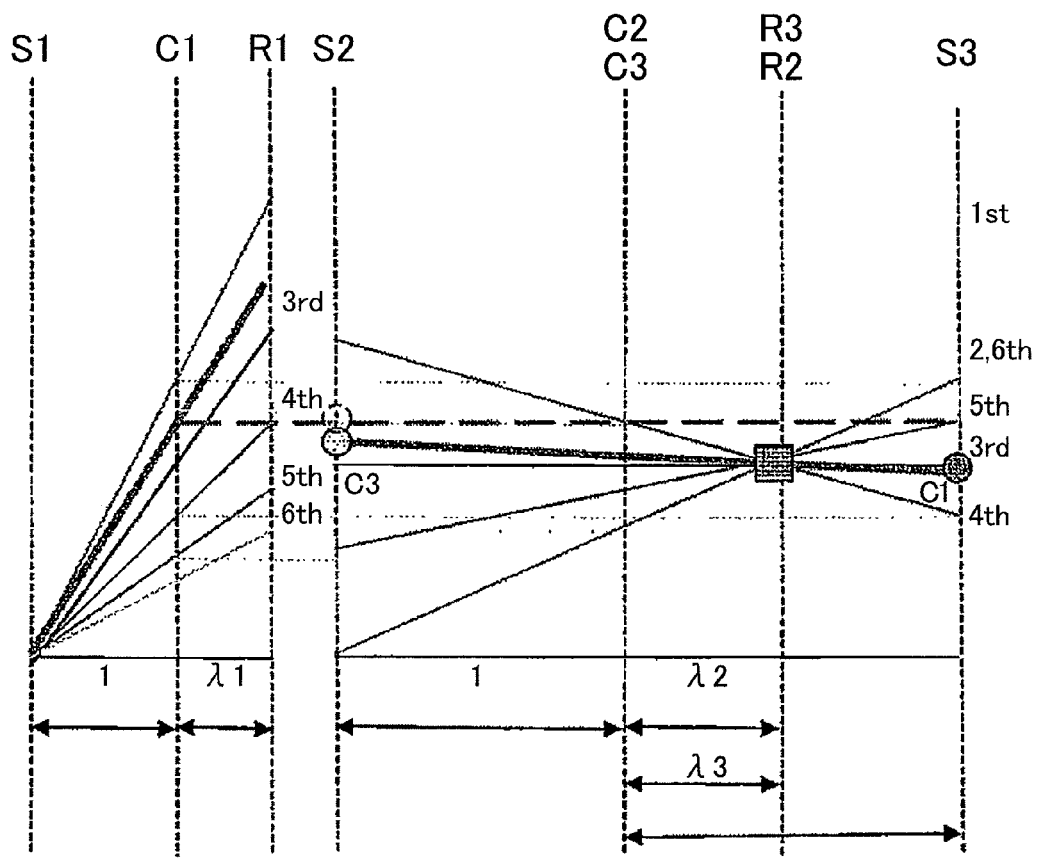
FIG. 10 is a velocity diagram in which the relation of input and output is reversed from that of FIG. 4.
Figure 11:
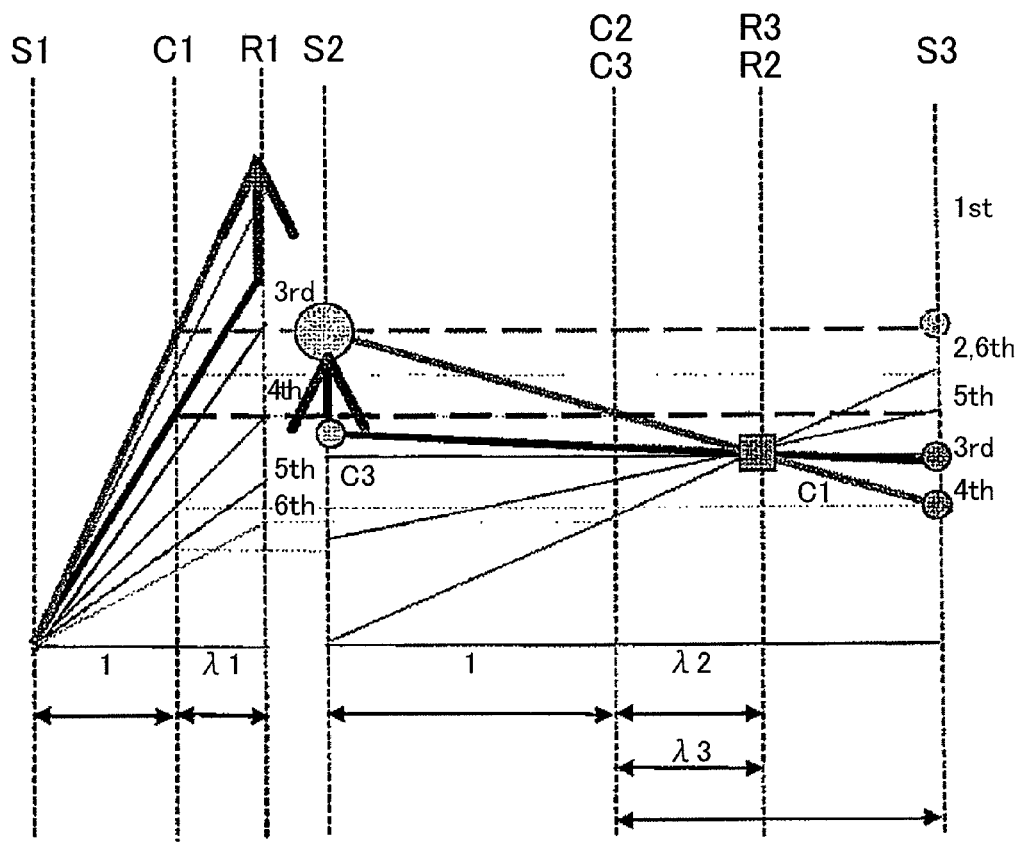
FIG. 11 is a velocity diagram in which the relation of input and output is reversed from that of FIG. 4.
Figure 13:
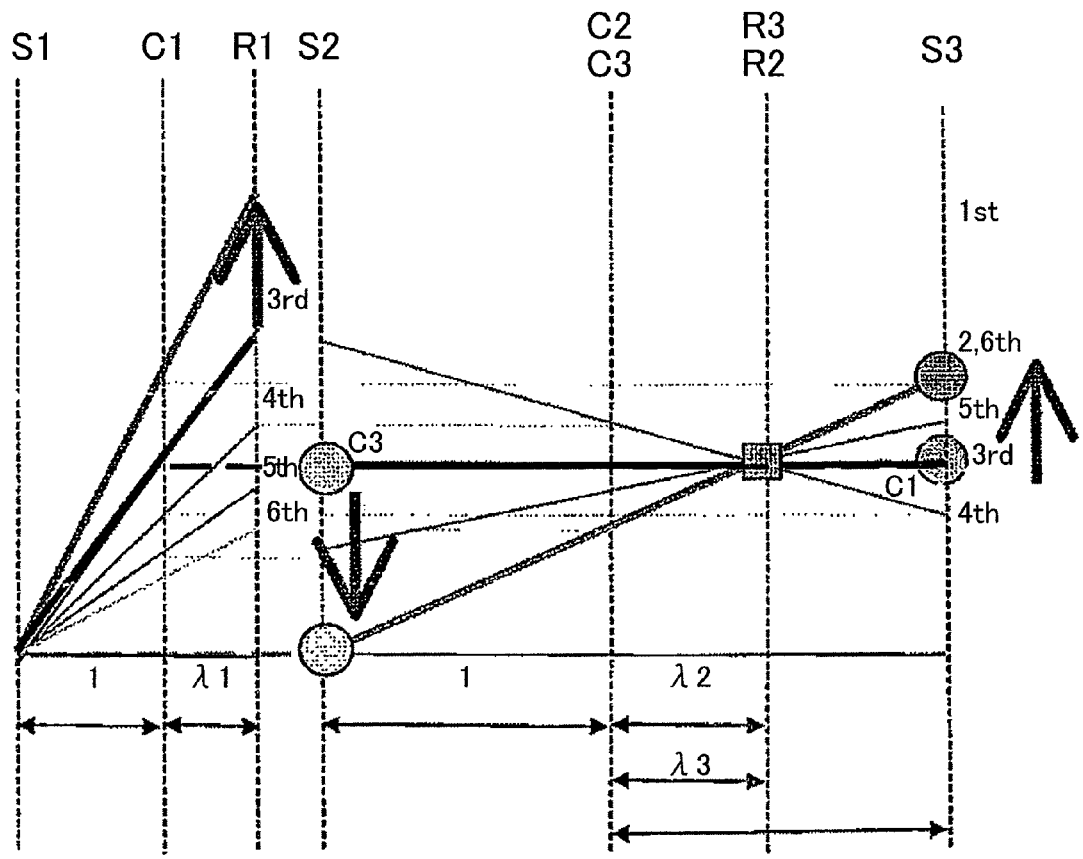
FIG. 13 is a velocity diagram in which the relation of input and output is reversed from that of FIG. 4.

Then, when the shift progress judging section 33 has judged that the first shift end judgment is satisfied (S15; YES), the procedure proceeds to S16 and starts engagement hold completion control A (control A), which brings up the pressure quickly at a steep rate by some amount (corresponding to time $t_7$ to $t_8$ in FIG. 9). The engagement hold completion control A quickly increases the pressure of the hydraulic servo until immediately before rotation difference of the clutches is eliminated. In other words, along with starting to supply the engagement pressure of the first shift (pressure of the clutch C-1), the engagement hold completion control A controls, by feedback control, the engagement pressure of the clutch C-3 so as to increase, so that the turbine rotation is suppressed from revving up. FIG. 10 shows the velocity diagram for this case.

At S17, the engaging-side shift control section 32 monitors the release torque capacity of the second shift (clutch C-3), and calculate a target pressure of a predetermined necessary value or more, judges whether or not the torque capacity of the clutch C-1 (first shift engagement torque capacity) is higher than the value represented as torque capacity of clutch C-3 (second shift release torque capacity)×α (safety factor for inertia); if not (S17; NO), the engagement hold completion control A in S16 is repeated. Then, if the torque capacity of the clutch C-1 is judged to be higher than the value represented as torque capacity of clutch C-3×α (S17; YES), the engaging-side shift control section 32 stops the engagement hold completion control A, and proceeds to S18 in which engagement hold completion control B (control B) is started to perform a sweep-up operation at a comparatively mild rate (corresponding to time $t_8$ to $t_{11}$ in FIG. 9).

If the present invention is not applied, a velocity diagram is obtained as shown in FIG. 1 when the relation torque capacity of clutch C-3×α>torque capacity of clutch C-1 is satisfied at S17. In that case, although the carrier CR1 and the sun gear S2 can be synchronized by supplying the hydraulic pressure to the clutch C-3, the torque capacity of the clutch C-1 is low (small). Therefore, although the carrier CR1 is connected to the sun gear S2 by engaging the clutch C-3, the ring gear R1 does not connect to the carrier CR2 because the clutch C-2 is not engaged, and the carrier CR1 does not connect to the sun gear S3 because the clutch C-1 is not engaged. As a result, the rotation difference between the carrier CR1 and the sun gear S3 becomes larger, thereby preventing the generation of force to slow down (suppress) the turbine rotation.

Compared with this, in the present non-limiting embodiment, because it is controlled so that torque capacity of clutch C-3×α<torque capacity of clutch C-1 is satisfied at S17, a velocity diagram is obtained as shown in FIG. 12. In that case, because the torque capacity of the clutch C-1 is increased in accordance with the increase in the torque capacity of the clutch C-3, the carrier CR1 is connected to the sun gear S2 by engaging the clutch C-3, and the carrier CR1 is connected to the sun gear S3 by engaging the clutch C-1, in the state in which the ring gear R1 does not connect to the carrier CR2 because the clutch C-2 is not engaged. Therefore, a force is generated to slow down the turbine rotation.

Next, at S18 (corresponding to time $t_8$ to $t_{11}$ in FIG. 9), as a result of the judgment in S17 that the condition is satisfied by supplying a hydraulic pressure whose target value is surely higher than the pressure corresponding to the torque capacity of the second shift release element, the engaging-side shift control section 32 starts the engagement hold completion control B. The engagement hold completion control B not only increases the torque capacity of the clutch C-1 at a mild basic rate, but also corrects the amount of increase in the torque capacity of the clutch C-3 serving as a second shift release element. Then, after executing the engagement hold completion control B, the procedure proceeds to S19.

At S19, based on the judgment made by the shift progress judging section 33 as to whether a second shift end judgment is satisfied (that is, whether the gear ratio has exceeded that of the second gear), the engaging-side shift control section 32 repeats S18 if a second shift end judgment is not satisfied, or if it is satisfied, proceeds to S20 to execute engagement hold completion control C (control C). During the above-described formation of the second gear, as shown by the velocity diagram in FIG. 13, the clutch C-3 is released while maintaining the torque capacity of the clutch C-1, and the brake B-1 is engaged to form the second gear. In that case, the carrier CR1 does not connect to the sun gear S2 because the clutch C-3 is not engaged, whereas the carrier CR1 is connected to the sun gear S3 because the clutch C-1 is engaged, and the sun gear S2 is locked by operation of the brake B-1.

At S20 (corresponding to time $t_{11}$ to $t_{12}$ in FIG. 9), the engagement hold completion control C (control C) is executed, and then the procedure proceeds to S21. The engagement hold completion control C controls the hydraulic pressure so as to be increased quickly at a steep rate, after the second shift has ended. Note that during the time $t_{11}$ to $t_{12}$ in FIG. 9, the hydraulic pressure is actually increased in the state that the change in torque distribution is reset to that of the second shift speed.

At S21, it is judged whether the shift control is to be terminated. The S20 is repeated while the shift control is judged not to be terminated, and the shift control is terminated when it is judged to be terminated.

In addition, in the control of the clutch C-3 serving as a second shift release element as shown in FIG. 7, the releasing-side shift control section 31 starts the 5th-to-2nd shift control at S31, and then at S32, monitors an amount of rotation change (ShiftR) to judge whether the amount of rotation change (ShiftR) exceeds a predetermined amount of rotation change (ShiftR>ShiftRallow_rel). The S32 is repeated while the relation ShiftR>ShiftRallow_rel is not satisfied (S32; NO), and when the relation ShiftR>ShiftRallow_rel is satisfied (S32; YES), the procedure proceeds to S33.

At S33 (corresponding to time $t_1$ to $t_4$ in FIG. 9), engagement hold standby control is started, and then the procedure proceeds to S34. At S34, based on the judgment made by the shift progress judging section 33, the releasing-side shift control section 31 judges whether the first shift end judgment is satisfied (the third gear is established); while it is not satisfied, S33 is repeated, and when it is satisfied, the procedure proceeds to S35.

At S35, downshift releasing control (releasing control of the 3rd-to-2nd shift) is started, and also the initial shift control is started; then, the procedure proceeds to S36.

At S36, by monitoring whether a shift speed of the third gear or higher is established in the 3rd-to-2nd shift, a judgment as to whether the second shift is to be started is made; while it is judged not to be started, S36 is repeated, and when it is judged to be started, the process proceeds to S37. At S37 (time $t_7$ to $t_8$ in FIG. 9), the inertia phase shift control, which releases hydraulic pressure at a constant rate, is executed, and then the procedure proceeds to S38.

At S38, ShiftR (amount of rotation change) is monitored to judge whether the amount of rotation change (ShiftR) exceeds a predetermined amount of rotation change (ShiftR>startFB). The S37 is repeated while the relation ShiftR>startFB is not satisfied (S38; NO), and when the relation ShiftR>startFB is satisfied (S38; YES), the procedure proceeds to S39.

At S39 (time $t_8$ to $t_{12}$ in FIG. 9), the engaging-side shift control section 32 starts rotation change rate control serving as feedback control to quickly increase the hydraulic pressure, and then the procedure proceeds to S40. At S40, based on the judgment made by the shift progress judging section 33, the releasing-side shift control section 31 judges whether the second shift end judgment is satisfied; while the second shift end judgment is not satisfied (S40; NO), S39 is repeated, and when the second shift end judgment is satisfied (S40; YES), the procedure proceeds to S41 to start completion control (time $t_{12}$ to $t_{14}$ in FIG. 9).

In addition, in the control of the brake B-1 serving as a second shift engagement element as shown in FIG. 8, the releasing-side shift control section 31 starts the 5th-to-2nd shift control at S51, and then at S52, monitors the amount of rotation change (ShiftR) to judge whether the amount of rotation change (ShiftR) exceeds a predetermined amount of rotation change (ShiftR>ShiftRallow_app). The S52 is repeated while the relation ShiftR>ShiftRallow_app is not satisfied (S52; NO), and when the relation ShiftR>ShiftRallow_app is satisfied (S52; YES), the procedure proceeds to S53.

At S53 (time $t_5$ to $t_8$ in FIG. 9), release hold standby control is started, then counting is preformed until the predetermined time cnt_S set in advance reaches 0 (cnt_S=0), and when the time reaches 0, the procedure proceeds to S54. The release hold standby control is a control to reduce a stroke (close a backlash) by some amount.

At S54, based on the judgment made by the shift progress judging section 33, the engaging-side shift control section 32 judges whether the first shift end judgment is satisfied; while it is not judged to be satisfied, S54 is repeated, and when it is judged to be satisfied, the procedure proceeds to S55.

At S55 (time $t_8$ to $t_{10}$ in FIG. 9), downshift engaging control is started, and also the servo start control is started; then, the procedure proceeds to S56. In other words, when the third gear is established after the end of the first shift control, the servo start control for stabilizing the stroke is started to output a constant pressure, and the procedure proceeds to S56.

At S56, the engaging-side shift control section 32, during the control in S55, judges whether the predetermined time cnt_S has passed a preset time Time_S_En (cnt_S>Time_S_En); while not passed, S55 is repeated, and when passed, the control is stopped and the procedure proceeds to S57.

At S57 (time $t_{10}$ to $t_{11}$ in FIG. 9), engaging control is started where hydraulic pressure is not increased but is made controllable to some extent by increase of torque, and the procedure proceeds to S58. At S58, the engaging-side shift control section 32 judges by the degree of shifting whether the condition for starting final control is satisfied; while the condition for starting the final control is not judged to be satisfied, the engaging control in S57 is repeated, and when the condition for starting the final control is judged to be satisfied, the procedure proceeds to S59.

At S59 (time $t_{11}$ to $t_{13}$ in FIG. 9), a sweep-up operation is performed at a constant rate, and the final control is started where the torque capacity of the brake B-1 is quickly increased; the procedure proceeds to S60. At S60, based on the judgment made by the shift progress judging section 33, the engaging-side shift control section 32 judges whether the second shift end judgment is satisfied; while the second shift end judgment is not satisfied, S59 is repeated, and when the second shift end judgment is satisfied, the procedure proceeds to S61 where the completion control (time $t_{13}$ to $t_{14}$ in FIG. 9) is started. In other words, the rotation change is monitored by detecting the rev-up of the engine 2, and when the rotation change is judged to have reached that of the target shift speed, engagement is performed in a timely manner.

In the non-limiting embodiment described above, during shifting by engagement switching of two different friction engagement elements, the releasing-side shift control section 31 calculates and outputs the release pressure of the clutch C-3 (second shift release element) required for producing an appropriate rotation change, based on FB control. In that case, the FB control using the clutch C-3 can be ensured by ensuring that the clutch C-1 has a sufficient reaction force, through monitoring of the torque capacity of the clutch C-3, in calculating the required torque capacity of the clutch C-1 (first shift engagement element).

To summarize, during downshifting, the shift controller 30 controls the hydraulic pressure of the clutch C-3 serving as a second shift release element by FB control, and in accordance with the increase in the torque capacity of the clutch C-3, also controls the torque capacity of the clutch C-1 serving as a first shift engagement element so as to be sufficiently higher than the amount of change in the torque capacity of the clutch C-3. As a result, this appropriate downshifting can effectively suppress the occurrence of adverse consequences in which a shift shock is generated because a sufficient reaction force cannot be ensured during engagement switching due to insufficient torque capacity of the first shift engagement element, and therefore because the second shift release element cannot be appropriately FB-controlled, resulting in difficulty in control of rotation change.

More specifically, during the downshift to the speed spaced apart by two or more steps through the intermediate shift speed by disconnecting and connecting the respective pairs of the friction engagement elements, the shift controller 30, after sequentially reducing each of the torque capacities of the clutch C-2 and the clutch C-3, increases and again reduces the torque capacity of the clutch C-3 by FB control, and also controls the torque capacity of the clutch C-1, which forms a reaction force during the FB control, so as to be sufficiently higher than the amount of change in the torque capacity of the clutch C-3, while monitoring the torque capacity of the clutch C-3 controlled by the FB control. By this means, the FB control of the clutch C-3 serving as a second shift release element is ensured by ensuring the sufficient reaction force of the clutch C-1 serving as a first shift engagement element, enabling effective generation of a suppressive force against engine racing.

Figure 15:
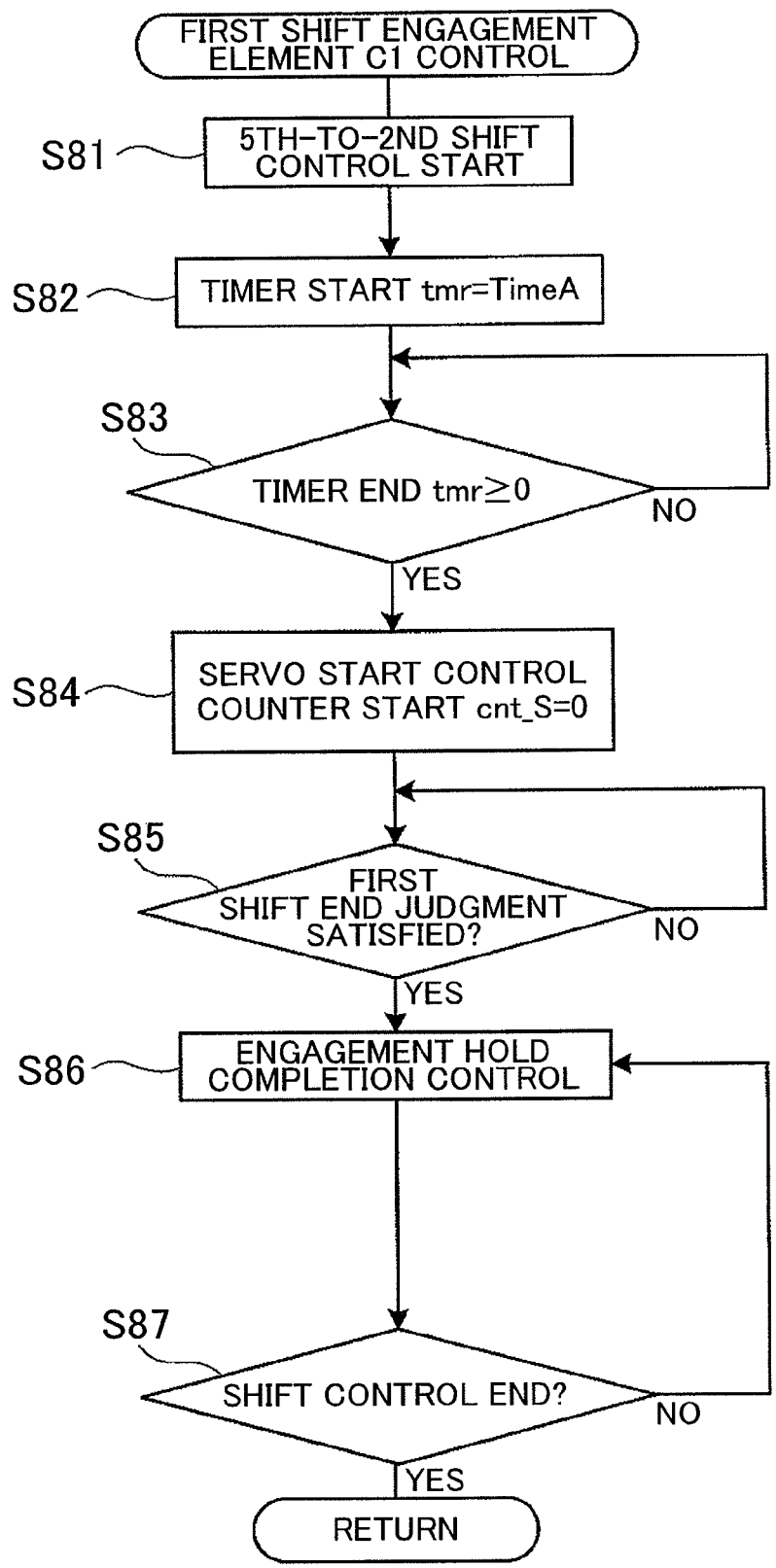
FIG. 15 is a flow chart for control of a first shift engagement element according to the technology serving as a basis for the present invention.

Note that the control of the clutch C-1 serving as a first shift engagement element, which has been described with reference to the flow chart shown in FIG. 6, is as shown by the flow chart in FIG. 15, according to the technology serving as a basis for the present invention. According to the technology serving as a basis for the present invention, although the processing of S81 to S85 shown in FIG. 15 are the same as that of S11 to S15 shown in FIG. 6, the processing from S86 and later differs from the present non-limiting embodiment.

In other words, according to the technology serving as a basis for the present invention, a judgment is made at S85 as to whether the first shift end judgment is satisfied. If it is judged that the first shift end judgment is satisfied (S85;YES), the procedure proceeds to S86 in which engagement hold completion control is started to increase (sweep up) the pressure of the hydraulic servo of the clutch C-1 at a constant rate. Then, at S87, it is judged whether the shift control has ended, and when it is judged as ended, the procedure terminates.

Figure 14:
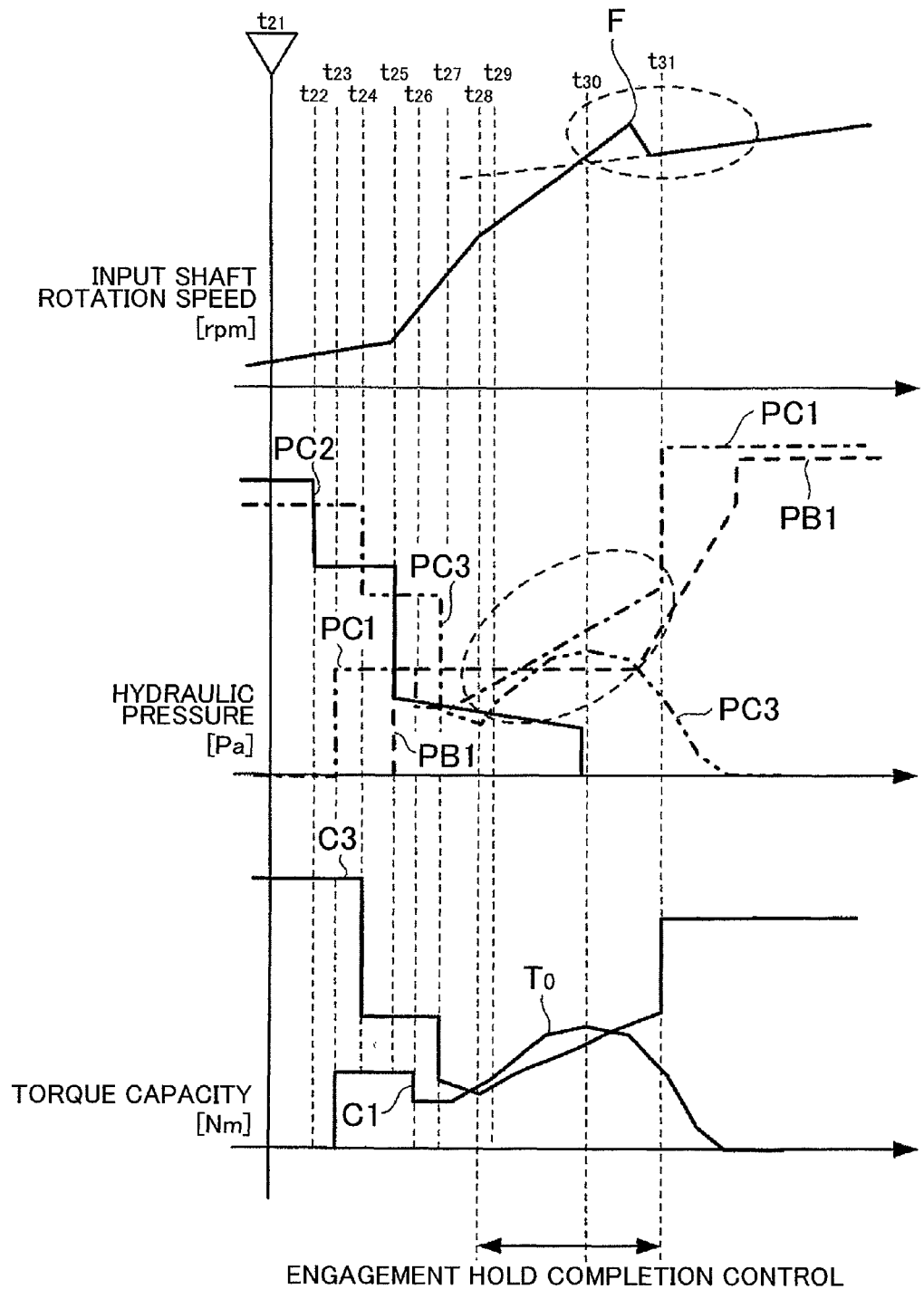
FIG. 14 is a time chart showing shift control with a technology serving as a basis for the present invention.

In the engagement hold completion control according to this basic technology, differently from in the engagement hold completion control of the present embodiment, because the hydraulic pressure to the clutch C-1 is simply increased at a constant sweep gradient, the torque capacity of the clutch C-1 is lower than that of the clutch C-3, bringing about a shortage in torque capacity To of the first shift engagement element, as shown in FIG. 14 (time $t_{28}$ to $t_{31}$ in FIG. 14). Therefore, because of an insufficient reaction force by the clutch C-1, even though the same release pressure is applied, an engine racing occurs, leading to generation of a shift shock F as shown in the time $t_{30}$ to $t_{31}$ of FIG. 14. In addition, according to the engagement hold completion control of the basic technology, although engagement is switched from the clutch C-1 to the clutch C-2 during the 5th-to-3rd shift, the shortage in torque capacity does not occur because the clutch C-3 has been left to maintain the engagement. However, during the subsequent 3rd-to-2nd shift, the clutch C-3 is released and the brake B-1 is engaged while the torque capacity of the clutch C-1 about to be engaged is increased, thus involving all the hydraulic pressures in the process of control. Accordingly, there is a possibility of shortage in torque capacity.

Note that in the above-described non-limiting embodiment, an example has been given in which the present invention is applied to the 5th-to-2nd shift (5th-3rd-2nd shift).

However, the present invention is not limited to this application, and can also be applied to, for example, a 5th-to-3rd shift (5th-4th-3rd shift).

In that case, while the first shift engagement element, which has taken the form of the clutch C-1 in the present embodiment, remains to take the same form of the clutch C-1, the first shift release element, which has taken the form of the clutch C-2 in the present embodiment, takes the form of the clutch C-3, the second shift release element, which has taken the form of the clutch C-3 in the present embodiment, takes the form of the clutch C-2, and the second shift engagement element, which has taken the form of the brake B-1 in the present embodiment, takes the form of the clutch C-3. By this means, it is possible to obtain the same effect as the present embodiment, and because the clutch C-1 serving as a first shift engagement element can be engaged as a second shift engagement element directly after being released, it is also possible to obtain the effect that the control system can be simplified compared with the case in which two different friction engagement elements are controlled separately as a first shift release element and a second shift engagement element.

Note that in the above-described non-limiting embodiment, explanation has been given of an example suitable for use in an FF type vehicle, as the automatic transmission 3 that achieves six forward speeds and one reverse speed. However, the present invention is not limited to this application, and can also be applied to an automatic transmission suitable for use in a vehicle of FR (front engine, rear drive) type or any other type.

The shift control apparatus for an automatic transmission according to some aspects of the present invention can be used in an automatic transmission mounted on a passenger vehicle, truck, bus, agricultural machine, or the like, and is particularly suitable for use in an automatic transmission capable of performing a jumping shift by engagement switching for which an improvement in shift shock is required.

The above description of the exemplary embodiments of the invention have been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A shift control apparatus in a stepped automatic transmission having a plurality of friction engagement elements whose engagement states achieve a plurality of corresponding power transmission paths in a speed change gear mechanism and which shifts speeds by switching engagement among the plurality of friction engagement elements, the shift control apparatus comprising:
a controller operative to control a downshift to a speed spaced apart by two or more steps through an intermediate shift speed by disconnecting and connecting respective pairs of the plurality of friction engagement elements at a single switching of the engagement of the plurality of friction engagement elements;
wherein the pairs of the friction engagement elements comprise:
a first pair of friction engagement elements comprising a first shift release element that is in an engaged state at a high shift speed that is higher in speed than the intermediate shift speed and released during shifting from the high shift speed to the intermediate shift speed, and a second shift release element that is in an engaged state at the high shift speed, maintains the engagement during shifting from the high shift speed to the intermediate shift speed and releasing the engagement during shifting from the intermediate shift speed to a low shift speed that is lower in speed than the intermediate shift speed; and
a second pair of friction engagement elements comprising a first shift engagement element that is in a released state at the high shift speed and engaged at the intermediate shift speed, and maintain the engagement until reaching the low shift speed, and a second shift engagement element that is in a released state at both the high and intermediate shift speeds, and engaged at the low shift speed;
wherein
during the downshift, the controller, after sequentially reducing torque capacity of the first shift release element and the second shift release element, increases torque capacity of the first shift engagement element so as to be higher than the torque capacity of the second shift release element, and then increases and again reduces the torque capacity of the second shift release element by feedback control, so that an appropriate rotation change is produced, and also controls so that the torque capacity of the first shift engagement element which forms a reaction force during the feedback control is increased in accordance with the increase in the torque capacity of the second shift release element, so as to be higher than the torque capacity of the second shift release element, while monitoring the torque capacity of the second shift release element controlled by the feedback control.

* * * * *